(12) United States Patent
Mori et al.

(10) Patent No.: US 8,795,913 B2
(45) Date of Patent: Aug. 5, 2014

(54) FUEL CELL SYSTEM AND CONTROL METHOD THEREOF

(75) Inventors: Hiroaki Mori, Nagoya (JP); Kenji Umayahara, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 134 days.

(21) Appl. No.: 13/382,791

(22) PCT Filed: Jul. 9, 2009

(86) PCT No.: PCT/JP2009/062552
§ 371 (c)(1),
(2), (4) Date: Jan. 6, 2012

(87) PCT Pub. No.: WO2011/004489
PCT Pub. Date: Jan. 13, 2011

(65) Prior Publication Data
US 2012/0107709 A1    May 3, 2012

(51) Int. Cl.
*H01M 8/04*    (2006.01)

(52) U.S. Cl.
USPC ........................................................ 429/428

(58) Field of Classification Search
USPC ........................................................ 429/428
See application file for complete search history.

(56) References Cited

U.S. PATENT DOCUMENTS

2008/0096057 A1*    4/2008  Bono ................................ 429/9

FOREIGN PATENT DOCUMENTS

| CN | 101032049 A | 9/2007 |
|---|---|---|
| JP | 2007-209161 A | 8/2007 |
| JP | 2007-335151 A | 12/2007 |
| JP | 2008-004482 A | 1/2008 |
| JP | 2009-043530 A | 2/2009 |
| JP | 2009-048972 A | 3/2009 |
| WO | 2008/099743 A1 | 8/2008 |

OTHER PUBLICATIONS

Machine Translation of JP 2007-335151 A.*
International Search Report mailed Sep. 15, 2009 of PCT/JP2009/062552.

* cited by examiner

*Primary Examiner* — Jonathan Jelsma
(74) *Attorney, Agent, or Firm* — Kenyon & Kenyon LLP (57) ABSTRACT

A fuel cell system including a fuel cell, and a converter which is connected between the fuel cell and a high voltage system and which sets an output ceiling voltage of the fuel cell, the fuel cell system comprising fuel gas supply stopping means for stopping the supply of fuel gas to the fuel cell in an intermittent operation mode, remaining fuel gas amount determination means for determining whether fuel gas in at least an amount capable of generating power remains in the fuel cell, converter driving means for driving the converter so that, when it is determined that fuel gas in at least the amount capable of generating power remains in the fuel cell, the output ceiling voltage of the fuel cell becomes a first voltage capable of preventing deterioration of the fuel cell, and converter stopping means for stopping the converter when it is determined that fuel gas in at least the amount capable of generating power does not remain in the fuel cell.

9 Claims, 8 Drawing Sheets

FUEL CELL SYSTEM AND CONTROL METHOD THEREOF

This is a 371 national phase application of PCT/JP2009/062552 filed 9 Jul. 2009, the contents of which are incorporated herein by reference.

TECHNICAL FIELD

The present invention relates to a fuel cell system to be mounted on a vehicle or the like, and in particular relates to effective power consumption reduction technology upon stopping the power generation of a fuel cell.

BACKGROUND ART

As a fuel cell system to be mounted on a vehicle, a system comprising a plurality of DC-DC converters has been developed. For example, JP-A-2007-209161 discloses a fuel cell system comprising a first DC-DC converter disposed between an electric storage device and an inverter, and a second DC-DC converter disposed between a fuel cell and an inverter.

With this system, when the target motor output is greater than a predetermined threshold, the driving of the first DC-DC converter is stopped, the second DC-DC converter is set to an electrically, directly-connected state, and the output power of the fuel cell with greater output is preferentially supplied to the motor over the output power of the electric storage device. Moreover, when the target motor output is smaller than the threshold, the first DC-DC converter is operated to supply assisted power from the electric storage device, and the second DC-DC converter is set to an electrically, directly-connected state. According to this kind of configuration, it is possible to prevent the traveling performance of the vehicle from deteriorating, and enable efficient power conversion (Patent Literature 1).

CITATION LIST

Patent Literatures

Patent Literature 1: JP-A-2007-209161

SUMMARY OF INVENTION

Technical Problem

Nevertheless, when the driving of the first DC-DC converter is stopped as with the invention of Patent Literature 1, it was discovered that drawbacks will arise. Specifically, when the driving of the first DC-DC converter is stopped, a certain amount of fuel gas remains inside the fuel cell.

The first DC-DC converter controls the upper limit of the output voltage of the fuel cell. When the driving of this first DC-DC converter is stopped, the output voltage of the fuel cell is no longer limited. If fuel gas in at least an amount capable of generating power remains in the fuel cell when the driving of the first DC-DC converter is stopped, the output voltage of the fuel cell will rise without being restricted. When the first DC-DC converter is set to an electrically, directly-connected state when the driving is stopped, the output voltage of the fuel cell could rise up to the input voltage of the inverter, which is a high voltage system.

However, the output voltage of the fuel cell has an upper limit (hereinafter referred to as the "high-potential avoiding voltage") in order to prevent the deterioration of the electrolyte membrane and other reasons. When the driving of the first DC-DC converter is stopped in a state where fuel gas in at least an amount capable of generating power remains in the fuel cell, the output voltage could rise and exceed the high-potential avoiding voltage.

Thus, in order to overcome the foregoing problem, in one preferred mode of the present invention, an object is to provide a fuel cell system and a control method thereof capable of reducing the power consumption while inhibiting the deterioration of the fuel cell.

Solution to Problem

One mode of the fuel cell system for resolving the foregoing problems is a fuel cell system comprising a fuel cell, a converter which is connected between the fuel cell and a high voltage system, and which sets an output ceiling voltage of the fuel cell, and a control device which controls the fuel cell and the converter, wherein, when it is determined that fuel gas in at least an amount capable of generating power remains in the fuel cell in an intermittent operation mode, the control device prohibits the converter from being stopped.

Another mode of the fuel cell system for resolving the foregoing problems is a fuel cell system comprising an inverter connected to a loading device, a first converter connected between a fuel cell and the inverter, and which sets an output ceiling voltage of the fuel cell, a second converter connected between an electric storage device and the inverter, and which sets an input voltage of the inverter, and a control device which controls the first converter and the second converter, wherein, when it is determined that fuel gas in at least an amount capable of generating power remains in the fuel cell in an intermittent operation mode, the control device prohibits the first converter from being stopped.

Yet another mode of the fuel cell system for resolving the foregoing problems is a fuel cell system including a fuel cell, and a converter which is connected between the fuel cell and a high voltage system and which sets an output ceiling voltage of the fuel cell, comprising fuel gas supply stopping means for stopping the supply of fuel gas to the fuel cell in an intermittent operation mode, remaining fuel gas amount determination means for determining whether fuel gas in at least an amount capable of generating power remains in the fuel cell, converter driving means for driving the converter so that, when it is determined that fuel gas in at least the amount capable of generating power remains in the fuel cell, the output ceiling voltage of the fuel cell becomes a first voltage capable of preventing deterioration of the fuel cell, and converter stopping means for stopping the converter when it is determined that fuel gas in at least the amount capable of generating power does not remain in the fuel cell.

One mode of the method of controlling the fuel cell system for resolving the foregoing problems is a method of controlling a fuel cell system including a fuel cell, and a converter which is connected between the fuel cell and a high voltage system and which sets an output ceiling voltage of the fuel cell, comprising the steps of stopping the supply of fuel gas to the fuel cell in an intermittent operation mode, determining whether fuel gas in at least an amount capable of generating power remains in the fuel cell, controlling the converter so that, when it is determined that fuel gas in at least the amount capable of generating power remains in the fuel cell, the output ceiling voltage of the fuel cell becomes a first voltage capable of preventing deterioration of the fuel cell, and stopping the converter when it is determined that fuel gas in at least the amount capable of generating power does not remain in the fuel cell.

When the fuel cell is in an intermittent operation mode, the power generation of the fuel cell is stopped and the supply of fuel gas to the fuel cell is basically stopped. Even when the supply of the fuel gas is stopped, there are cases where fuel gas remains inside the fuel cell. If the limitation of the output ceiling voltage is lifted when the remaining fuel gas exists in an amount capable of generating power, the output power of the fuel cell will rise due to the remaining fuel gas, and exceed the high-potential avoiding voltage. With respect to this point, according to the present invention, the upper limit setting by the output ceiling voltage is effective since the converter is not stopped when fuel gas in at least an amount capable of generating power remains, it is possible to prevent the output voltage from reaching the high-potential avoiding voltage.

The present invention can also selectively add the following elements as needed.

(1) Preferably, when it is determined that fuel gas in at least the amount capable of generating power remains in the fuel cell, the converter is controlled so that the output ceiling voltage of the fuel cell becomes a first voltage capable of preventing deterioration of the fuel cell. According to the foregoing configuration, since the output voltage of the fuel cell is capped at the first voltage while fuel gas in at least an amount capable of generating power remains, it is possible to prevent the deterioration of the fuel cell.

(2) Preferably, when an output voltage of the fuel cell is a predetermined threshold voltage or higher, it is determined that fuel gas in at least the amount capable of generating power remains. The output voltage of the fuel cell will decrease if there is shortage in the fuel gas. Thus, the remaining condition of the fuel gas can be properly determined by comparing the output voltage of the fuel cell with the threshold voltage for determining the existence of residual fuel gas.

(3) Preferably, when a pressure of the fuel gas is a predetermined threshold pressure or higher, it is determined that fuel gas in at least the amount capable of generating power remains. If the fuel gas is reduced, then the pressure of the fuel gas is also reduced. Thus, the remaining condition of the fuel gas can be properly determined by comparing the pressure of the fuel gas with the threshold pressure for determining the existence of residual fuel gas.

(4) Preferably, the converter is stopped when it is determined that fuel gas in at least the amount capable of generating power does not remain in the fuel cell. If there is no residual fuel gas, the output voltage of the fuel cell will not rise even when the limitation of the output ceiling voltage is lifted. Thus, by stopping the converter when it is determined that there is no residual fuel gas, it is possible to reduce the consumed voltage while preventing the drawback of rise in the output voltage.

(5) Preferably, when the output voltage of the fuel cell reaches a threshold voltage for supplying the fuel gas, the converter is foremost driven, and the fuel gas is subsequently supplied. Even in the intermittent operation mode, if the output voltage of the fuel cell decreases excessively, drawbacks will arise in the fuel cell. Thus, when the output voltage decreases, it is necessary to supply an appropriate amount of fuel gas. According to the foregoing configuration, since the converter is first driven upon supplying the fuel gas, the upper limit setting by the output ceiling voltage is already effective when the output voltage starts to rise in the supply of the fuel gas, and it is possible to prevent the output voltage from reaching the high-potential avoiding voltage.

(6) Preferably, the converter is controlled so that the output ceiling voltage of the fuel cell becomes a second voltage capable of preventing deterioration of the fuel cell. Since the output ceiling voltage is set to the second voltage upon first driving the converter, it is possible to prevent the output voltage from reaching the high-potential avoiding voltage.

Advantageous Effects of Invention

According to this invention, since the rise in output voltage of the fuel cell is prevented upon stopping the converter, it is possible to reduce the power consumption while inhibiting the deterioration of the fuel cell.

DESCRIPTION OF EMBODIMENTS

The preferred embodiments for working the present invention are now explained with reference to the drawings.

The descriptions of the following drawings are schematic. Accordingly, the specific change characteristics shall be determined through comparison with the ensuing explanation. Moreover, it goes without saying that mutually different characteristics are included among the mutual drawings. In addition, although the following embodiments describe performing all processes with a single control device, they cover cases where a plurality of control units coordinate to complete the control processing according to the present invention.

(Definitions)

The terms used in this specification are defined as follows.

The term "intermittent operation mode" means an operation mode of temporarily stopping the power generation of the fuel cell other than the complete stop of the system. This is executed in a state where it is not necessary to supply power directly from the fuel cell because the load is small or other reasons. Power generation is intermittently executed, temporarily, in order to prevent adverse effects on the unit cells as a result of the voltage of the unit cells configuring the fuel cell decreasing excessively.

The term "high voltage system" means a system on the secondary side of the fuel cell converter (first converter 11 in the ensuing explanation). This system is normally supplied with voltage that is higher than the output voltage of the fuel cell based on the pressure-rise processing of the fuel cell converter. However, this does not mean that the voltage on the secondary side as a high voltage system is constantly higher than the voltage of the system on the primary side to which the fuel cell is connected.

The term "fuel gas" means hydrogen gas and/or oxidation gas (air). The term "amount capable of generating power" means an amount in which the output voltage can be increased if fuel gas in that amount remains in the fuel cell. Specifically, this is an amount of fuel gas which enables the output voltage Vfc to reach the open voltage OCV, which has adverse effects on the cells of the fuel cell.

(Embodiments)

This embodiment is a mode of prohibiting the converter from being stopped when it is determined that fuel gas in at least an amount capable of generating power remains in the fuel cell in an intermittent operation mode.

(System Configuration)

Figure 1:
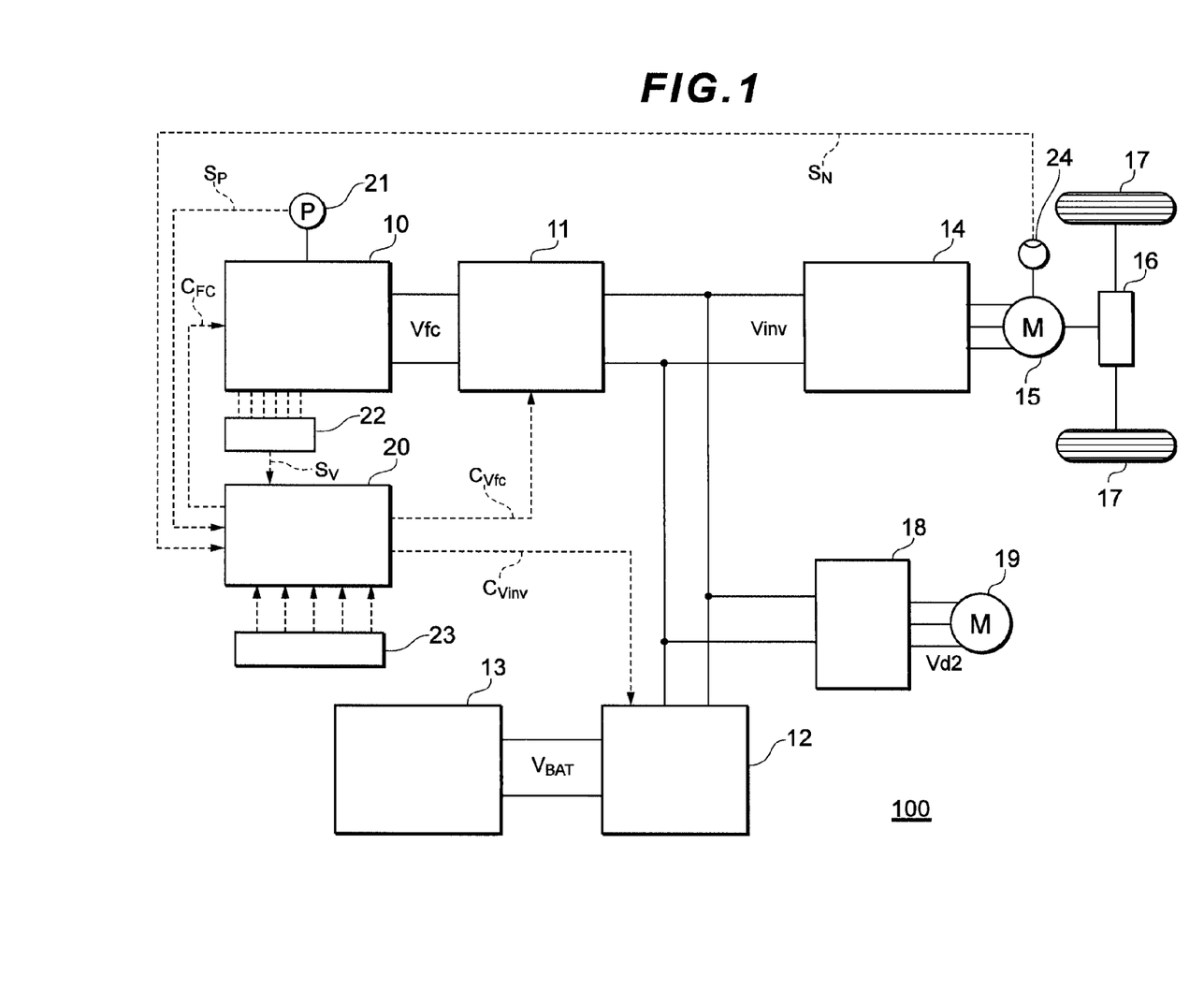
FIG. 1 is a system configuration diagram of the FCHV system according to an embodiment of the present invention.

FIG. 1 is a block diagram of a fuel cell system 100 to be mounted on a vehicle according to embodiment 1. This kind of vehicle is referred to as a fuel cell hybrid vehicle (FCHV: Fuel Cell Hybrid Vehicle).

The fuel cell system 100 is configured by comprising a fuel cell 10, a first converter 11, a second converter 12, a battery 13, an inverter 14, a motor 15, an auxiliary inverter 18, a high voltage auxiliary machine 19, and a control device 20.

The fuel cell 10 is power generation means configured by a plurality of unit cells being laminated in series. The unit cells are structured by sandwiching a membrane electrode assembly (MEA: Membrane Electrode Assembly) with separators. The membrane electrode assembly comprises a structure of sandwiching an ion-exchange membrane such as a polymeric electrolyte membrane with an anode electrode and a cathode electrode. The anode electrode is configured by providing an anode electrode catalytic layer on a spongy support layer, and the cathode electrode is configured by providing a cathode electrode catalytic layer on a spongy support layer. Hydrogen gas is supplied from a hydrogen gas supply system not shown to the anode electrode of the respective unit cells via a separator. Oxidation gas (air in this embodiment) is supplied from an oxidation gas supply system not shown to the cathode electrode of the respective unit cells via a separator. A coolant passage is formed on the separator, and the coolant is supplied from a coolant supply system not shown. In the fuel cell 10, the oxidation reaction of formula (1) occurs in the anode electrode, the reduction reaction of formula (2) occurs in the cathode electrode, and the electrogenic reaction of formula (3) occurs in the overall fuel cell 10.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

As a result of a plurality of unit cells being connected in series, the fuel cell 10 outputs the output voltage Vfc to the output terminal. The fuel cell 10 has predetermined current-voltage output characteristics (I-V characteristics), and the output current and the output power will change in correspondence with the change of the output voltage Vfc.

The inside of the fuel cell 10; for example, the supply port or the discharge port as the mouth of the hydrogen gas supply system of the fuel cell 10, is provided with a pressure sensor 21. When the supply of hydrogen gas is blocked by the shutoff valve not shown provided to the foregoing supply port and discharge port, the pressure sensor 21 detects the pressure of the hydrogen gas supply system inside the fuel cell 10 and outputs a pressure detection signal $S_P$. Moreover, a cell monitor 22 is provided to the unit cells configuring the fuel cell 10. The cell monitor 22 detect the voltage of the unit cells and output a cell voltage detection signal $S_V$.

The first converter 11 is the voltage converter according to the present invention, and is configured as a DC-DC converter. When a three-phase operation system is adopted, the first converter 11 comprises, for example, a circuit configuration of a three-phase bridge-shaped converter or the like. The three-phase bridge-shaped converter comprises a switching element configured from a reactor, a rectification diode, an IGBT (Insulated Gate Bipolar Transistor), and the like. As a result of combining these elements, formed are a circuit portion similar to an inverter which once converts the input DC voltage into AC, and a portion which once again rectifies the AC and converts it into a different DC voltage. Note that the circuit configuration of the first converter 11 is not limited to the foregoing configuration, and various configurations can be adopted so as long as it is possible to control the output voltage Vfc of the fuel cell 10.

With the first converter 11, an output terminal of the fuel cell 10 is connected to the primary side, and an input terminal of the inverter 14 is connected to the secondary side. The secondary side corresponds to the high voltage system in this embodiment. The terminal voltage of the fuel cell 10; that is, the upper limit voltage of the output terminal voltage Vfc is prescribed according to the command $C_{Vfc}$ from the control device 20 which commands the output ceiling voltage Vfc_MAX of the primary side. Accordingly, when the first converter 11 is operating, the output voltage Vfc of the fuel cell 10 will not exceed the output ceiling voltage Vfc_MAX that was set. The first converter 11 operates to subject the output voltage Vfc of the fuel cell 10 to voltage conversion (pressure rising), and causes it to match the input voltage Vinv of the inverter 14 which prescribes the voltage of the high voltage system on the secondary side. Moreover, the first converter 11 starts and stops the operation according to the command $C_{Vfc}$ from the control device 20 which commands the driving/stopping. Specifically, when the first converter 11 receives the command $C_{Vfc}$ from the control device 20 for stopping the operation, it turns ON a part of the internal switching element, and causes the primary side and the secondary side to be electrically and directly connected. Moreover, when the first converter 11 receives the command $C_{Vfc}$ from the control device 20 which commands driving, it performs control so that the output voltage Vfc of the fuel cell 10 on the primary side falls to the output ceiling voltage Vfc_MAX, that was previously set, or below the Vfc_MAX.

The battery 13 is an electric storage device, and functions as a storage source of surplus power among the power that was generated by the fuel cell 10, a regeneration energy storage source during regeneration braking, and an energy buffer during the load change associated with the acceleration or deceleration of the fuel cell vehicle. As the battery 13, used may be, for example, second batteries such as a nickel-cadmium storage battery, a nickel-hydrogen storage battery, and a lithium secondary battery. The output terminal voltage $V_{BAT}$ of the battery 13 becomes the input voltage of the second converter 12.

The second converter 12 is a voltage converter, and is configured as a DC-DC converter as with the first converter 11. With the second converter 12, an output terminal of the battery 13 is connected to the primary side, and an input terminal of the inverter 14 is connected to the secondary side. The second converter 12 is configured to control the terminal voltage of the secondary side (input voltage Vinv of the inverter 14) according to the command $C_{Vinv}$ from the control device 20. For example, when the required power of the motor 15 is changed, the second converter 12 changes the input voltage Vinv of the inverter 14 until it reaches the target input voltage that was set. Moreover, the first converter 11 controls the output voltage Vfc of the fuel cell 10. Note that, as the circuit configuration of the second converter 12, various configurations can be adopted so as long as it is possible to control the input voltage Vinv of the inverter 14.

The inverter 14 is a power converter, and is configured to convert the DC current, which is to be supplied to the input terminal, into an AC current and supply it the motor 15. The circuit configuration of the inverter 14 comprises, for example, a PWM inverter circuit that is driven by pulse-width modulation. The inverter 14 is configured to supply, to the motor 15, three-phase AC power having a predetermined driving voltage Vd (effective value).

The motor 15 is a traction motor for driving a vehicle, and provides propulsion force to the vehicle when the driving power is supplied, and generates regeneration power when the vehicle is decelerated. The differential 16 is a deceleration device, and is configured to decelerate the high-speed rotation of the motor 15 at a predetermined ratio, and rotate the shaft provided with a tire 17. The motor 15 is provided with a rotational speed sensor 24. The rotational speed sensor 24 detects the rotation speed of the motor 15 and outputs the rotational speed signal $S_N$ to the control device 20.

The auxiliary inverter 18 is a power converter, and is configured to convert the DC current, which is to be supplied to the input terminal, into an AC current and supply it to the high voltage auxiliary machine 19. The circuit configuration of the auxiliary inverter 18 is the same as the inverter 14 described above. Note that the high voltage auxiliary machine 19 is a collective designation of the humidifier, air compressor, hydrogen pump, and coolant pump, all not shown, for causing the fuel cell system 100 to function.

The control device 20 is a computer system for controlling the fuel cell system 100 and comprises, for example, a CPU, a RAM, a ROM and the like. The control device 20 inputs the pressure detection signal $S_P$ from the pressure sensor 21, and detects the pressure of the hydrogen gas. Moreover, the control device 20 can measure the voltage value of the respective unit cells by inputting the voltage detection signal $S_V$ from the cell monitor 22. Moreover, the control device 20 can compute the rotational speed N of the motor 15 by inputting the rotational speed signal $S_N$ from the rotational speed sensor 23. In addition, the control device 20 implements the various computations required for the control by inputting various signals from the sensor group 22. Note that, as the sensor group 22, included are an accelerator opening sensor which shows the accelerator (gas pedal) opening not shown, a current sensor which detects the output current of the fuel cell 10, a voltage sensor which detects the output voltage Vfc of the fuel cell 10, a temperature sensor which detects the coolant temperature of the fuel cell 10, and a rotational speed sensor which detects the rotational speed of the air compressor, hydrogen pump, coolant pump and the like.

The control device 20 controls the overall system by referring to the foregoing signals. For example, the control device 20 performs the following processing, but the processing is not limited thereto.

(1) to input a switch signal from an ignition switch not shown and cause the fuel cell system 10 to start or stop;

(2) to retrieve the accelerator opening not shown, the detection signal of the shift position, and the rotational speed detection signal $S_N$ from the rotational speed sensor 24, and compute the control parameters such as the system-demanded power as the required power supply amount;

(3) to retrieve the pressure detection signal $S_P$ from the pressure sensor 21, and control the rotational speed of an air compressor not shown so that the hydrogen gas supply amount to the hydrogen gas supply system not shown becomes an appropriate amount;

(4) to perform control so that the amount of oxidizing off-gas that is discharged to the oxidizing off-gas exhaust passage not shown becomes an appropriate amount;

(5) to regulate the opening of the root valve not shown or the pressure of the ejector so that the hydrogen gas supply amount supplied to the hydrogen gas supply passage becomes an appropriate amount based on the pressure relative value of the various pressure sensors provided to the respective locations of the hydrogen gas supply passage and the oxidation gas supply passage;

(6) to control the rotational speed of the hydrogen pump not shown or control the opening of the purge valve not shown so that the amount of hydrogen off-gas circulating in the circulation pathway of the hydrogen gas supply system becomes an appropriate amount;

(7) to control the opening and closing of the respective valves according to the operation mode;

(8) to compute the circulation amount of coolant based on the relative value of the coolant temperature, and control the rotational speed of the coolant pump provided to the cooling system not shown;

(9) to estimate the water content of the fuel cell 10 based on the output voltage Vfc of the fuel cell 10 detected by the voltage sensor and the output current Vfc detected by the current sensor, and control the scavenging amount when the vehicle is stopped; and (10) to control the device configuring the power system of the first converter 11, the second converter 12, and the like.

In particular, the control device 20 performs the following processing as the control to be performed to the power system.

Foremost, in a normal operation mode, the control device 20 computes the motor-demanded torque based on the accelerator (gas pedal) opening and the motor rotational speed N, and subsequently computes the motor-demanded power based on the motor-demanded torque and the motor rotational speed N. Next, the control device 20 computes the power that needs to be generated based on the motor-demanded power and the high voltage auxiliary machine-demanded power, and subsequently computes, from the current-voltage (I-V) characteristics of the fuel cell 10, the output voltage Vfc of the fuel cell 10 that is required for outputting the power that needs to be generated. As needed, the control device 20 decides the distribution of the respective output powers of the fuel cell 10 and the battery 13. Subsequently, the control device 20 outputs, to the first converter 11, the command $C_{Vfc}$ for causing the demanded output voltage Vfc to become the output ceiling voltage Vfc_MAX to the fuel cell 10. Moreover, the control device 20 outputs, to the second converter 12, the command $C_{Vinv}$ so that the demanded power of the battery 13 can be retrieved, and thereby controls the input voltage Vinv of the inverter 14; that is, the voltage of the high voltage system.

Meanwhile, in an intermittent operation mode, the control device 20 executes the control processing of the present invention. Specifically, in the intermittent operation mode, when it is determined that fuel gas (hydrogen gas in this embodiment) in at least an amount capable of generating power remains in the fuel cell 10, the control device 20 is characterized in operating so as to prohibit the first converter 11 from being stopped. The function and operation are now explained in further detail.

(Functional Block)

Figure 2:
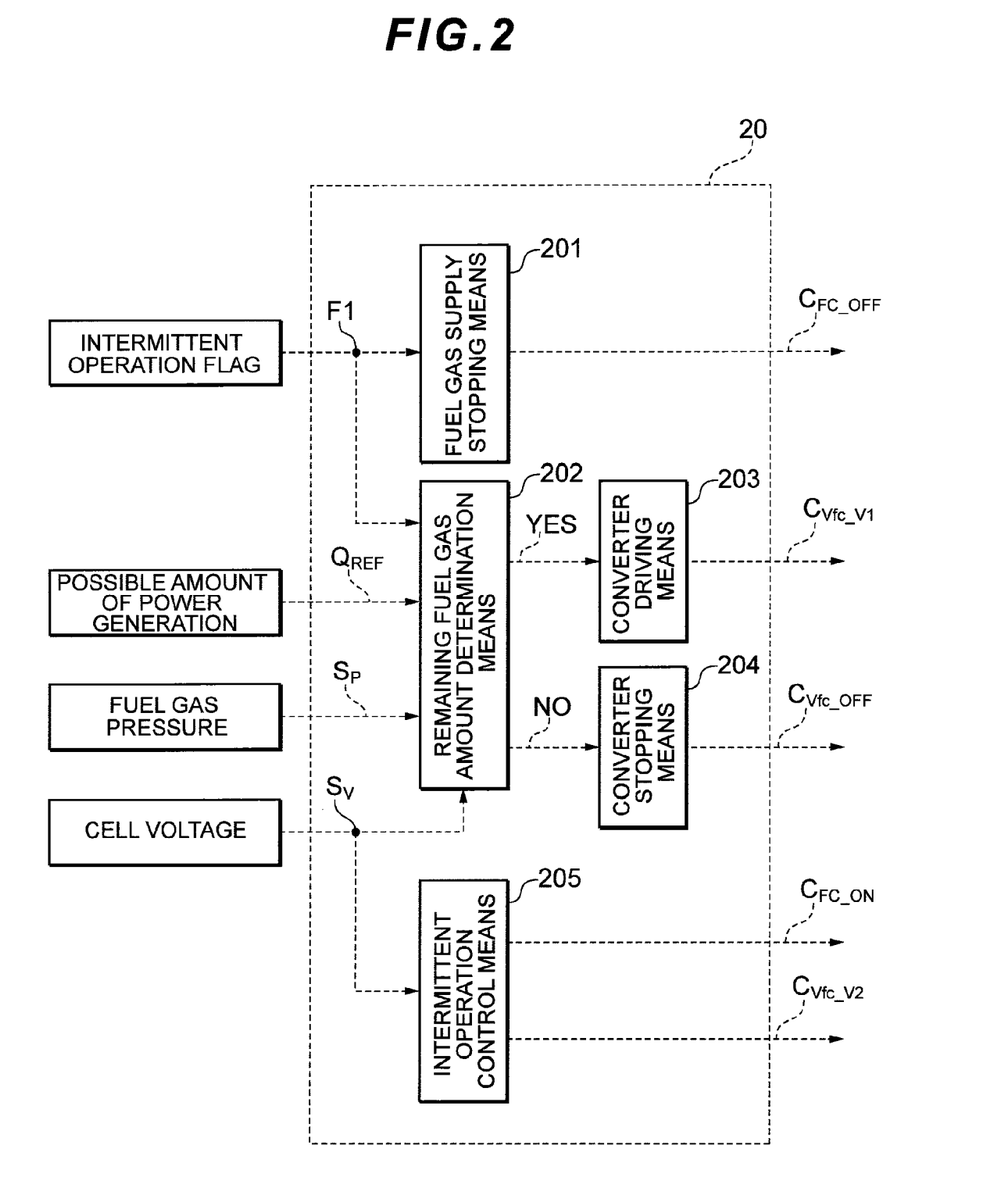
FIG. 2 is a functional block diagram which executes the power control of the fuel cell system according to this embodiment.

FIG. 2 shows a functional block diagram of the fuel cell system 100 that is functionally realized by the control device 20 of embodiment 1. These functional blocks are functionally realized by the control device 20 calling, regularly or irregularly, the programs for executing the control processing (refer to FIG. 7 and FIG. 8) of the present invention in the intermittent operation mode.

Note that the functional blocks shown in FIG. 2 are configured where the functions are divided for the sake of convenience, but they do not necessarily have to be functionally separated as shown in FIG. 2. The same functions can be realized with functional blocks that are different from FIG. 2 can also be realized so as long as the configuration is able to start/stop of the first converter 11 based on the inputs enumerated in FIG. 2 and command the output ceiling voltage Vfc_MAX of the fuel cell 10.

As shown in FIG. 2, as the functional blocks, the control device 20 comprises fuel gas supply stopping means 201, remaining fuel gas amount determination means 202, converter driving means 203, converter stopping means 204, and intermittent operation control means 205.

The fuel gas supply stopping means 201 is a functional block that stops the supply of fuel gas to the fuel cell 10 in the intermittent operation mode. The fuel gas referred to above is hydrogen gas and oxidation gas. For example, the fuel gas supply stopping means 201 closes the shutoff valve (not shown) provided to the hydrogen gas supply port and the shutoff valve (not shown) provided to the oxidation gas supply port, which lead to the fuel cell 10.

The remaining fuel gas amount determination means 202 is a functional block which determines whether fuel gas in at least an amount capable of generating power remains in the fuel cell 10. The fuel gas referred to above is hydrogen gas in this embodiment. However, the same processing can also be performed with oxidation gas. Moreover, the same processing can also be performed with both hydrogen gas and oxidation gas. The determination of whether the fuel gas amount remaining in the fuel cell 10 is an amount capable of generating power can be performed, for example, based on the following methods.

(1) When the determination is to be performed using a detected voltage, it can be determined that the fuel gas in at least the amount capable of generating power remains in the fuel cell 10 when the output voltage (cell voltage) Vfc of the fuel cell 10 is a predetermined threshold voltage Vth1 or higher. The output voltage Vfc of the fuel cell 10 will decrease if there is shortage in the fuel gas. The remaining fuel gas amount is correlated with the output voltage Vfc of the fuel cell 10. Thus, the remaining condition of the fuel gas can be properly determined by comparing the output voltage Vfc of the fuel cell 10 with the threshold voltage Vth1 for determining the existence of residual fuel gas. Note that the voltage to be detected can be the voltage of one or more unit cells to be detected by the cell monitor 22, or the voltage of the overall laminated unit cells; that is, the output voltage Vfc that is detected by the output terminal of the fuel cell 10.

(2) When the determination is to be performed using a detected pressure, preferably, it is determined that fuel gas in at least the amount capable of generating power remains in the fuel cell 10 when the pressure Pfc of the fuel gas is a predetermined threshold pressure Pth or higher. If the fuel gas is reduced, then the pressure of the fuel gas in the fuel cell 10 is also reduced. The pressure of the fuel gas is directly correlated with the remaining fuel gas amount. Thus, the remaining condition of the fuel gas can be properly determined by comparing the pressure P of the fuel gas with the threshold pressure Pth for determining the existence of residual fuel gas. Note that, although the hydrogen gas pressure of the hydrogen gas supply system is detected in this embodiment, the configuration may also be such that the oxidation gas pressure of the oxidation gas supply system is detected.

The converter driving means 203 is a functional block that drives the first converter 11 so that the output ceiling voltage Vfc_MAX of the fuel cell 10 becomes the first voltage V1 capable of preventing deterioration of the fuel cell 10 when it is determined that fuel gas in at least the amount capable of generating power remains in the fuel cell 10.

With the fuel cell 10, the output voltage Vfc could rise all the way up to the open voltage OCV if the output ceiling voltage Vfc_MAX based on the driving of the first converter 11 is not limited. Nevertheless, if the output voltage Vfc rises all the way up to the open voltage OCV, there are adverse effects such as deterioration in the electrolytic membrane of the unit cells of the fuel cell 10. Thus, the output voltage Vfc of the fuel cell 10 should be controlled to be a predetermined voltage (this is hereinafter referred to as the "high-potential avoiding voltage") Vh_LIM or lower, which is sufficiently lower than the open voltage OCV, so that it does not rise to a voltage that will have adverse effects.

However, in an intermittent operation mode, fundamentally speaking, the first converter 11 needs to be stopped. When the driving of the first converter 11 is stopped, in this embodiment, the primary side and the secondary side are electrically and directly connected. When the primary side and the secondary side of the first converter 11 are directly connected, the primary side voltage of the first converter 11 could rise up to the secondary side voltage; that is, the input voltage Vinv of the inverter 14. The input voltage Vinv of the inverter 14 is a voltage of the high voltage system that is controlled by the second converter 12, and there are cases where it may be higher than the high-potential avoiding voltage, and even higher than the open voltage OCV of the fuel cell 10. Thus, when fuel gas in at least the amount capable of generating power remains in the fuel cell 10, the output voltage Vfc must be prevented from rising to the same as or higher than the high-potential avoiding voltage. Thus, when fuel gas in at least the amount capable of generating power remains in the fuel cell 10, the converter driving means 203 controls the output ceiling voltage Vfc_MAX of the fuel cell 10 so that it becomes the first voltage V1 capable of preventing the deterioration of the fuel cell 10. The first voltage V1 needs to be at least the same as or less than the high-potential avoiding voltage Vh_LIM.

The converter stopping means 204 is a functional block that stops the first converter 11 when it is determined that fuel gas in at least the amount capable of generating power does not remain in the fuel cell 10. When the fuel gas remaining in the fuel cell 10 falls below the amount capable of generating power, even if the upper limit restriction by the output ceiling voltage of the output voltage Vfc is lifted, the output voltage Vfc of the fuel cell 10 will not rise. Thus, when it is determined that fuel gas does not remain in the fuel cell 10, the converter stopping means 204 stops the first converter 11. In order to stop the first converter 11, the converter stopping means 204 outputs a command $C_{FC\_OFF}$ to the first converter 11 for stopping the driving. Simultaneously with the stop of the operation, the primary side and the secondary side of the first converter 11 will become a directly-connected state, and the voltage on the primary side will rise up to the input voltage Vinv of the inverter 14 on the secondary side. Nevertheless, since the fuel gas is depleted by then, the output voltage Vfc of the fuel cell 10 will not rise.

Note that whether fuel gas in at least an amount capable of generating power exists in the fuel cell 10 can be determined by using a predetermined threshold. When performing the determination using the output voltage Vfc (cell voltage) of the fuel cell 10, whether the output voltage Vfc fell to the predetermined threshold voltage Vth1 or below is determined. When performing the determination using the fuel gas pressure of the fuel cell 10, whether the pressure Pfc of the fuel gas fell to the predetermined threshold pressure Pth or below is determined.

The functions of the foregoing converter driving means 203 and converter stopping means 204 are explained in further detail with reference to FIG. 3 and FIG. 4.

In the normal operation mode, let it be assumed that the output ceiling voltage Vfc_MAX of the first converter 11 is maintained at the predetermined voltage V0 in order to obtain appropriate power generation. Based on the upper limit setting of the first converter 11, the output voltage Vfc of the fuel cell 10 also hovers around predetermined voltage V0.

Upon entering the intermittent operation mode, as described above, fundamentally speaking, the first converter 11 needs to be stopped. For example, as shown in FIG. 4, when the intermittent operation flag indicating the intermittent operation mode is turned ON, there should be no problem of immediately switching the ON state of the driving status of the first converter 11 to the OFF state; that is, a stopped state. When the first converter 11 enters a stopped state, as shown in FIG. 4, the voltage on the primary side of the first converter 11 could rise to the voltage on the secondary side; that is, the input voltage Vinv of the inverter 14. However, immediately after entering the intermittent operation mode, there is a slight amount of residual fuel gas. Thus, immediately after the first converter 11 is stopped, power is generated using the remaining fuel gas, and the actual output voltage Vfc of the fuel cell 10 will, at once, rise up to the input voltage Vinv of the inverter 14 as the secondary side voltage of the first converter 11 as shown in FIG. 4. Nevertheless, there are cases where the secondary side voltage of the first converter 11 is higher than the high-potential avoiding voltage Vh_LIM of the fuel cell 10. Thus, the output voltage Vfc of the fuel cell 10 will exceed the avoiding voltage Vh_LIM. As the fuel gas is consumed by power generation, the output voltage Vfc will gradually decrease. Even still, in the area shown as area B with the diagonal lines in FIG. 4, an output voltage Vfc that has adverse effects on the fuel cell 10 is generated.

Figure 3:
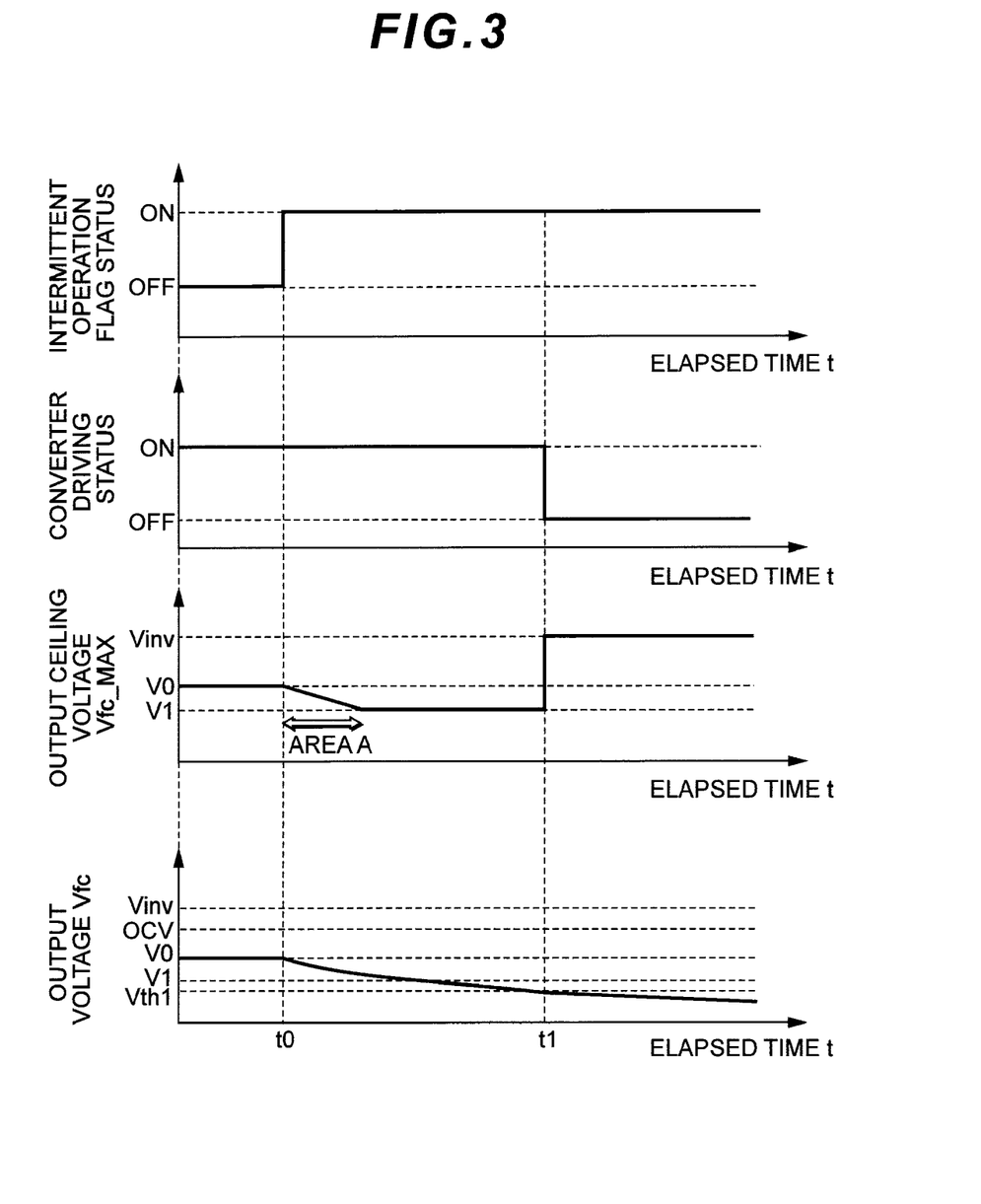
FIG. 3 is a transit chart showing the change in the output ceiling voltage Vfc_MAX as the command value to the first converter upon applying this invention and the actual output voltage Vfc of the fuel cell 10.
Figure 4:
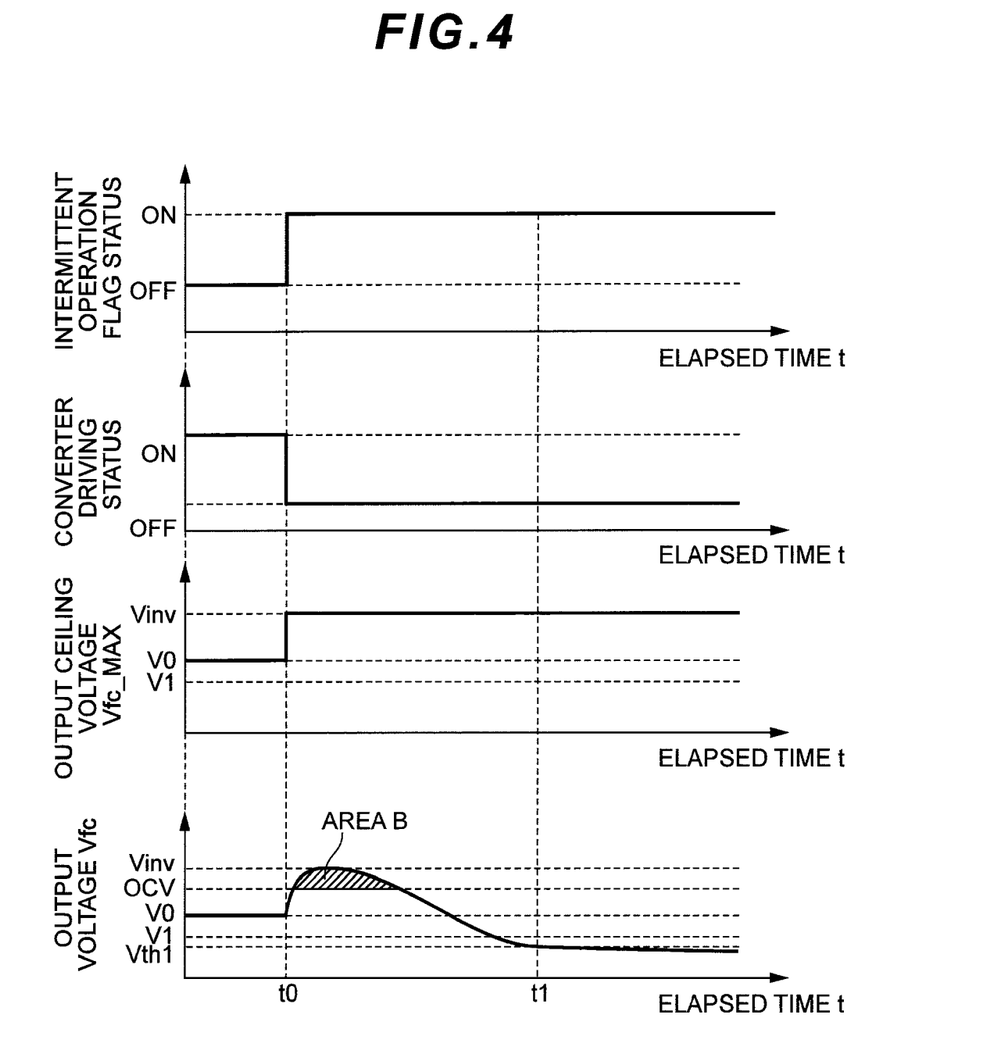
FIG. 4 is a transit chart showing the change in the output ceiling voltage Vfc_MAX as the command value to the first converter when this invention is not applied and the actual output voltage Vfc of the fuel cell 10.

Meanwhile, as shown in FIG. 3, in this embodiment, when it is determined that fuel gas in at least an amount capable of generating power remains in the fuel cell 10, the output ceiling voltage Vfc_MAX of the fuel cell 10 is controlled to become the first voltage V1 capable of preventing the deterioration of the fuel cell 10 prior to the converter driving means 203 stopping the first converter 11.

Specifically, as shown in FIG. 3, even upon entering the intermittent operation mode and the intermittent operation flag is turned ON, the first converter 11 is not stopped immediately. Instead, a command $C_{Vfc\_V1}$ is output to the first converter 11 for causing the output ceiling voltage Vfc_MAX of the fuel cell 10 to become the first voltage V1. Thus, while sufficient fuel gas remains even upon entering the intermittent operation mode and even if the supply of the fuel gas is stopped, the output voltage Vfc of the fuel cell 10 will not rise to the same as or higher than the first voltage V1. When the fuel gas remaining in the fuel cell 10 is consumed and falls below the amount capable of generating power, the output voltage Vfc starts to fall to the first voltage V1 or below.

In addition, as shown in FIG. 3, when the output voltage Vfc of the fuel cell 10 falls to the foregoing predetermined threshold voltage Vth1 (or threshold pressure Pth) or below, the converter stopping means 204 stops the first converter 11.

Note that, if the output ceiling voltage Vfc_MAX of the fuel cell 10 changes considerably upon shifting from the normal operation mode to the intermittent operation mode, the processing (hereinafter referred to as the "rate processing") for gradually changing the output ceiling voltage Vfc_MAX can be applied. In FIG. 3, the rate processing is applied for a short period (area A) for changing the output ceiling voltage Vfc_MAX from the predetermined voltage V0 in the normal operation mode to the first voltage V1 in the intermittent operation mode. As a result of performing the rate processing, it is possible to prevent the fuel cell 10 from becoming damaged due to the sudden increase in the output power. The rate processing can be executed by restricting the rate of change of the output ceiling voltage Vfc_MAX to be a constant value or less (or a constant value).

The intermittent operation control means 205 is a functional block that foremost drives the first converter 11, and subsequently supplies the fuel gas when the output voltage Vfc of the fuel cell 10 reaches the threshold voltage Vth2 for supplying the fuel gas. If the output voltage Vfc of the fuel cell 10 decreases excessively, the electrolyte membrane of the unit cells could become damaged. Thus, the threshold voltage Vth2 is set as the voltage to be supplied to the fuel gas, and a slight amount of fuel gas is supplied when the output voltage Vfc decreases to the threshold voltage Vth2. Note that, in substitute for the threshold voltage Vth2, the pressure of the fuel gas remaining upon reaching the threshold voltage Vth2 can be used as the threshold pressure. Moreover, the fuel gas can also be supplied, for example, based on a processing of opening the shutoff valve not shown of the oxidation gas supply system of the fuel cell 10, and thereafter driving the compressor for a short period of time.

Here, the intermittent operation control means 205 controls the output ceiling voltage Vfc_MAX of the fuel cell 10 to become the second voltage V2 capable of preventing the deterioration of the fuel cell 10 upon driving the first converter 11. Since the supply of the foregoing fuel gas is for supplying fuel gas for causing the fuel cell 10 to generate power, the output voltage Vfc of the fuel cell 10 will rise as soon as the fuel gas is supplied. If this voltage exceeds the high-potential avoiding voltage Vh_LIM, it will have adverse effects on the fuel cell 10. Thus, the intermittent operation control means 205 sets the output ceiling voltage Vfc_MAX to the second voltage V2 upon first driving the first converter 11. The second voltage V2 needs to be set to a value that is not greater than the high-potential avoiding voltage Vh_LIM.

The functions of the foregoing intermittent operation control means 205 are now explained in further detail with reference to FIG. 5 and FIG. 6. As shown in FIG. 6, let it be assumed that the fuel gas is consumed with the lapse of time, and the threshold Vth2 for supplying fuel gas has been reached at time t2. The supply amount of the fuel gas is still zero. Here, as shown in FIG. 6, let it be assumed that a certain quantity q of the fuel gas is supplied while the first converter 11 is still stopped. Then, since this amount q of the fuel gas is exceeding the amount capable of generating power, the output voltage Vfc of the fuel cell 10 will rise drastically. Here, the first converter 11 is in a stopped state; that is, the primary side and the secondary side are electrically and directly connected, and it is possible that the output voltage Vfc may rise up to the input voltage Vinv of the inverter 14 on the secondary side. Thus, the output voltage Vfc of the fuel cell 10 will rise up to the voltage Vinv on the secondary side. If the voltage Vinv on the secondary side is greater than the high-potential avoiding voltage Vh_LIM of the fuel cell 10, a voltage that is undesirable for the electrolyte of the fuel cell 10 will arise.

Figure 5:
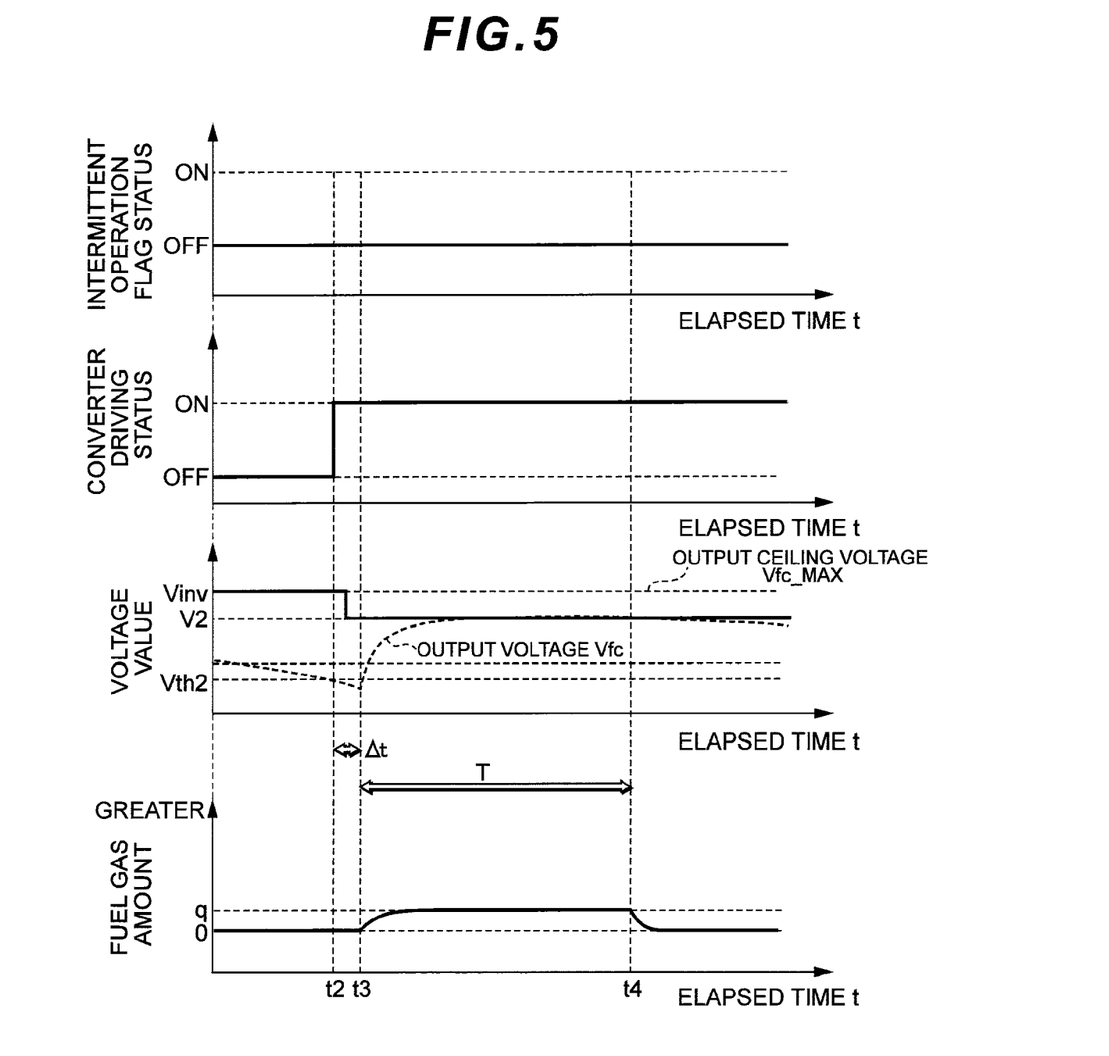
FIG. 5 is a transit chart showing the change in the output ceiling voltage Vfc_MAX, the output voltage Vfc, and the fuel gas amount of the fuel cell 10 upon applying this invention.
Figure 6:
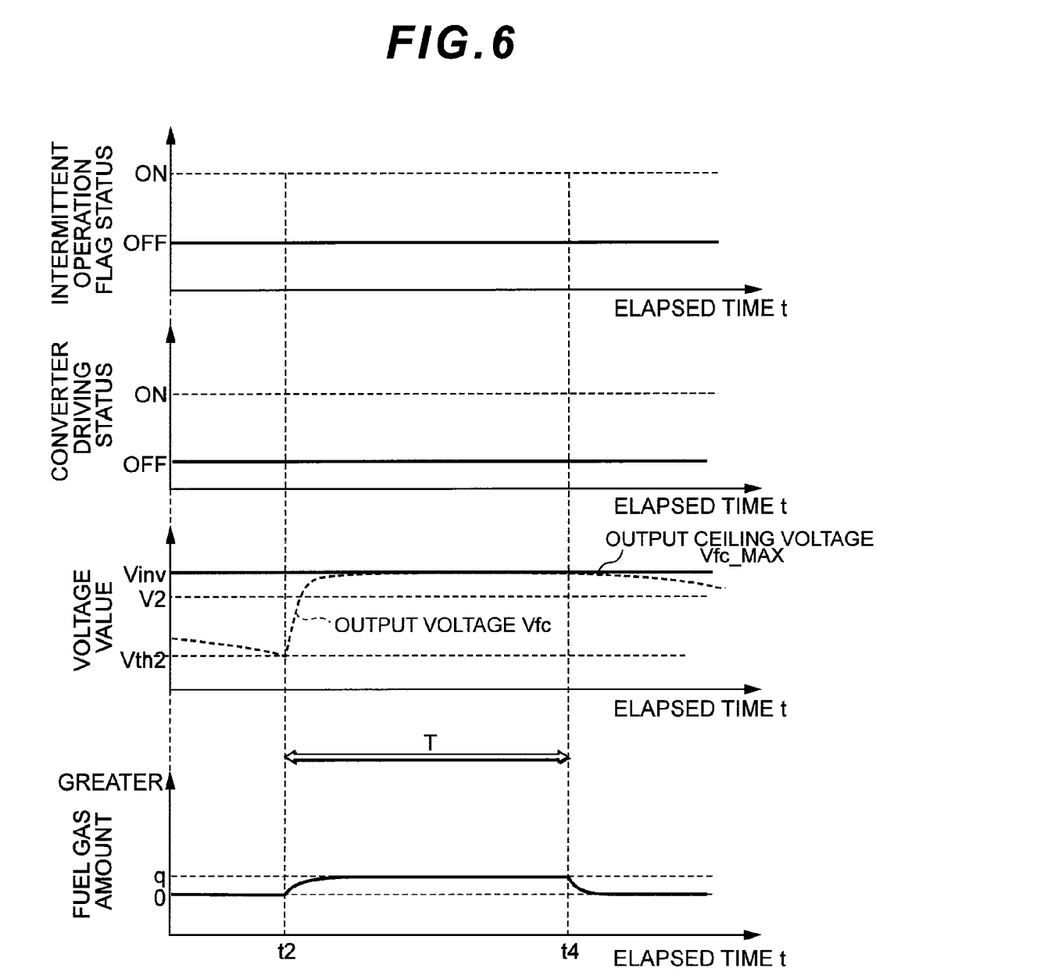
FIG. 6 is a transit chart showing the change in the output ceiling voltage Vfc_MAX, the output voltage Vfc, and the fuel gas amount of the fuel cell 10 when this invention is not applied.

Thus, the intermittent operation control means 205 of this embodiment turns ON the driving state of the first converter 11 prior to supplying the fuel gas as shown in FIG. 5. In other words, when the output voltage Vfc reaches the threshold voltage Vth2 at time t2, the intermittent operation control means 205 foremost outputs a command $C_{FC\_ON}$ for starting the driving of the first converter 11, and simultaneously outputs a command $C_{Vfc\_V2}$ for setting the output voltage Vfc of the fuel cell 10 to the second voltage V2 as the output ceiling voltage Vfc_MAX. Subsequently, at time t3 after the output ceiling voltage Vfc_MAX on the primary side of the first converter 11 actually becomes the second voltage V2, control is performed for supplying the fuel gas in the certain quantity q. At the point in time that the fuel gas was supplied, since the restriction of the output ceiling voltage Vfc_MAX is already effective, the output voltage Vfc is maintained at the second voltage V2, which is not greater than the high-potential avoiding voltage Vh_LIM, even when the fuel gas is supplied.

The supply of fuel gas is once again stopped at time t4 after the lapse of period T in sufficient fuel gas was supplied for returning the output voltage Vfc of the fuel cell 10 to a certain level. Thereafter, as shown in FIG. 3, the first converter 11 is driven until the remaining fuel gas amount becomes an amount capable of generating power or less, and the first converter 11 is thereafter stopped.

(Operation)

The control processing of the fuel cell system 100 of embodiment 1 that is realized by the foregoing functional blocks is now explained with reference to FIG. 7 and FIG. 8. The following control processing is processing that is repeated regularly or irregularly. For example, in this embodiment, let it be assumed that a software program for executing the control processing shown in FIG. 7 and FIG. 8 is retrieved (called) for each predetermined control cycle.

Foremost, when the operation mode is switched to the intermittent operation mode, the fuel gas supply stopping means 201 of FIG. 2 turns ON the intermittent operation flag, and stops the supply of fuel gas. When the supply of fuel gas is stopped, the fuel gas remaining in the fuel cell 10 is gradually consumed.

Figure 7:
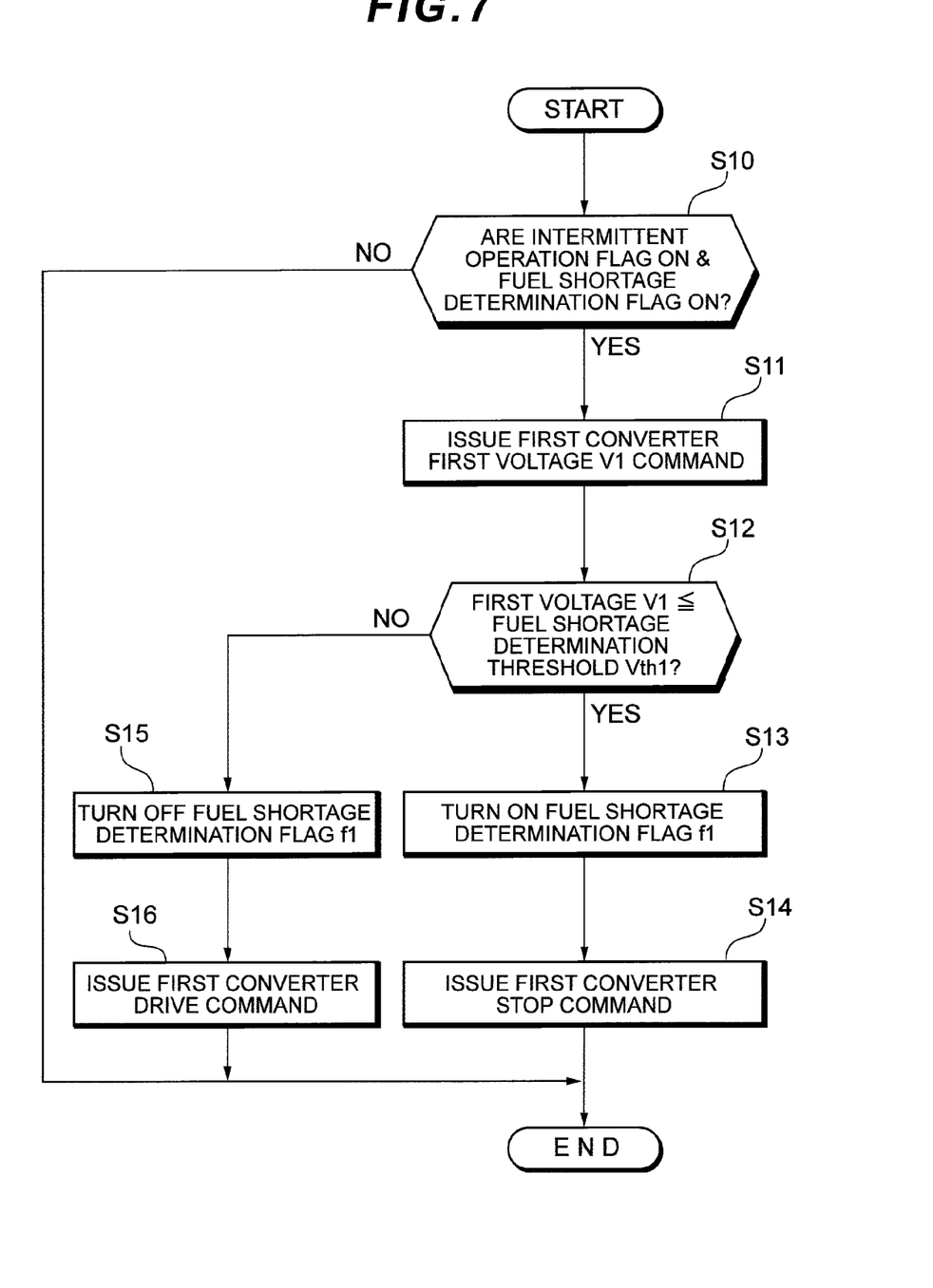
FIG. 7 is a control flowchart showing the start stage processing of the intermittent operation mode in this embodiment.
Figure 8:
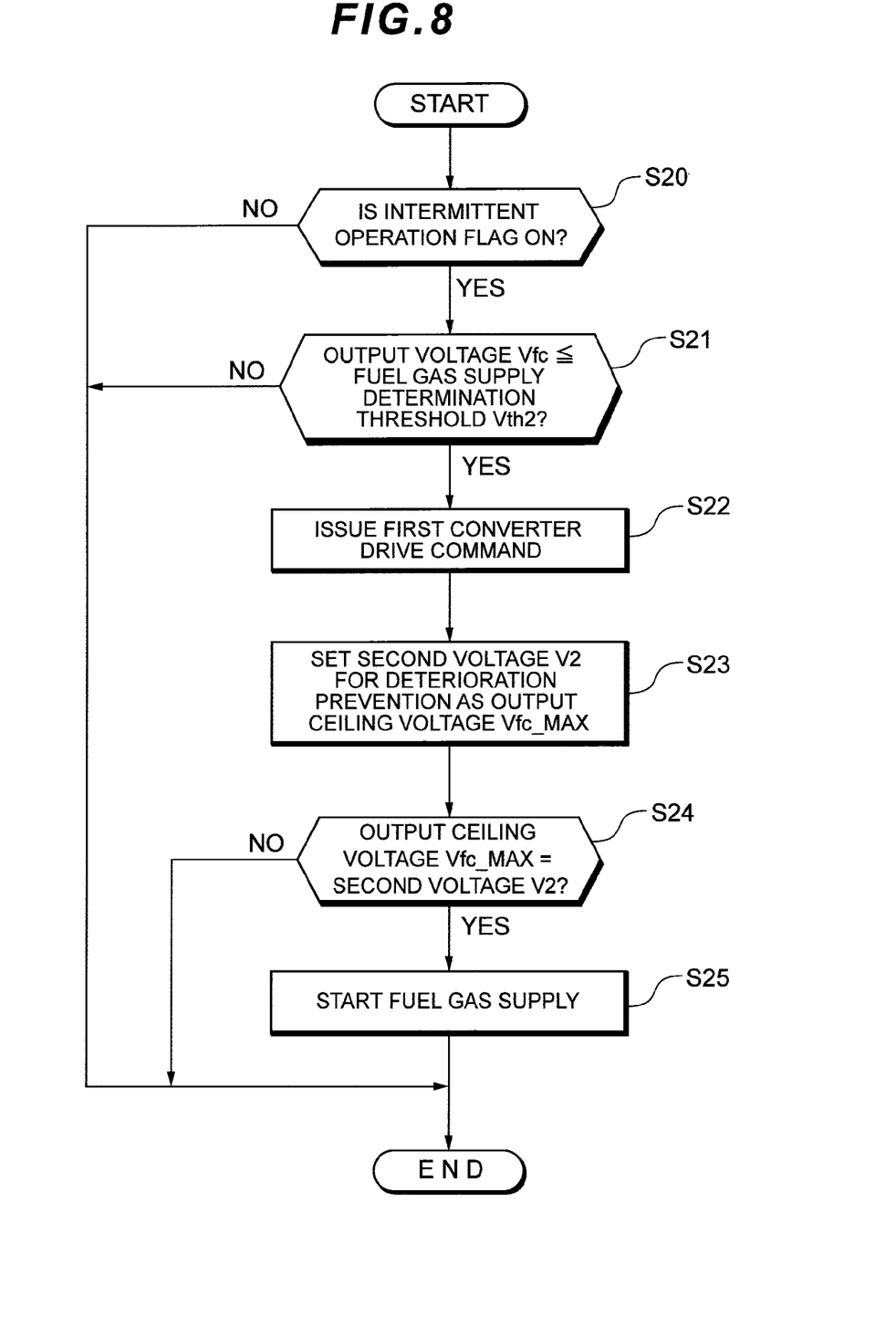
FIG. 8 is a control flowchart showing the fuel gas supply processing at the midway stage of the intermittent operation mode in this embodiment.

The respective steps of FIG. 7 shows the processing that is implemented by the remaining fuel gas determination means 202, the converter driving means 203, and the converter stopping means 204 of FIG. 2. In step S10 of FIG. 7, the control device 20 determines whether the intermittent operation flag showing that the operation mode is the intermittent operation mode is turned ON, and whether the fuel shortage determination flag showing that the fuel gas is in an amount capable of generating power or less is turned OFF.

In a state where the intermittent operation flag is not ON (NO), it is the normal operation mode, and, since this is unrelated to the foregoing processing, the routine returns from the processing.

When the intermittent operation flag is ON and the fuel shortage determination flag is OFF (YES), this shows that fuel gas in at least an amount capable of generating power still remains. Immediately after entering the intermittent operation mode, an abundant amount of fuel gas remains as a matter of course, and the fuel shortage determination flag is OFF. Thus, the processing proceeds to step S11, and the converter driving means 203 outputs a command $C_{Vfc\_V1}$, and sets the primary side voltage of the first converter 11; that is, the output ceiling voltage Vfc_MAX to the first voltage V1.

Subsequently, the processing proceeds to step S12, and the remaining fuel gas amount determination means 202 determines whether the output voltage Vfc of the fuel cell 10 is the fuel shortage determination threshold Vth1 or below, which is used for determining whether the fuel gas is in an amount capable of generating power or less. As a result of the determination, when it is determined that the output voltage Vfc of the fuel cell 10 is not the same as or lower than the fuel shortage determination threshold Vth1 (NO), this means that a large amount of fuel gas remains. Thus, the processing proceeds to step S15, and the converter driving means 203 turns OFF the fuel shortage determination flag f1 showing that the fuel gas is in the amount capable of generating power or less. Subsequently, the processing proceeds to step S16, and the converter driving means 203 outputs the commands $C_{FC\_ON}$ and $C_{Vfc\_V1}$, drives the first converter 11, and sets the output ceiling voltage Vfc_MAX to the first voltage V1. The consumption of the fuel gas is continued in this state. When this processing is executed for the second time onward upon entering the intermittent operation mode, so as long as the remaining fuel gas amount is greater than an amount capable of generating power, steps S15 and S16 are executed.

Meanwhile, in step S12, as a result of the determination, when it is determined that the output voltage Vfc of the fuel cell 10 fell to the fuel shortage determination threshold Vth1 or less (YES), this means that the remaining amount of the fuel gas is now no more than the amount capable of generating power. Thus, the processing proceeds to step S13, and the converter stopping means 204 turns ON the fuel shortage determination flag f1. Subsequently, the processing proceeds to step S14, and the converter stopping means 204 outputs a command $C_{FC\_OFF}$, and stops the first converter 11.

After step S16 and step S14 are ended, the processing is once returned.

The respective steps of FIG. 8 show the processing that is implemented by the intermittent operation control means 205 of FIG. 2. In step S20 of FIG. 8, whether the intermittent operation flag is ON is determined. As a result of the determination, when the intermittent flag is ON (YES), the processing proceeds to step S21, and the intermittent operation control means 205 determines whether the output voltage Vfc of the fuel cell 10 is not less than the determination threshold Vth2 of the minimum required fuel gas supply. As a result of the determination, when the fuel gas supply determination threshold Vth2 has not been reached (NO), since this means that the remaining amount of fuel gas has not decreased to a level where it will have adverse effects on the fuel cell 10, the processing is once returned.

As a result of the determination in step S21, when it is determined that it is the fuel gas supply determination threshold Vth2 or below (YES), this means that the remaining amount of fuel gas has decreased to a level where it will have adverse effects on the fuel cell 10. Thus, the processing proceeds to step S22, and the intermittent operation control means 205 foremost outputs a command $C_{FC\_ON}$, and commands the activation of the first converter 11. Subsequently, the processing proceeds to step S22, and the intermittent operation control means 205 outputs a command $C_{Vfc\_V2}$, and sets the output ceiling voltage Vfc_MAX of the first converter 11 to the second voltage V2 as the deterioration prevention voltage. Subsequently, the processing proceeds to step S24, and the intermittent operation control means 205 determines whether the output ceiling voltage Vfc_MAX of the first converter 11 has reliably reached the second voltage V2. As a result of the determination, when it is confirmed that the output ceiling voltage Vffc_MAX of the first converter 11 has reached the second voltage V2 (YES), the processing proceeds to step S25, and the intermittent operation control means 205 starts the supply of fuel gas. As a result of the determination, when the output ceiling voltage Vfc_MAX of the first converter 11 has not reached the second voltage V2 (NO), the processing is once returned to wait for the output ceiling voltage Vfc_MAX of the first converter 11 to be reflected in the second voltage V2.

(Advantages of Embodiment 1)

The following advantages are yielded according to embodiment 1.

(1) According to this embodiment, since the first converter 11 is prohibited from being stopped when it is determined that fuel gas in at least an amount capable of generating power remains, the upper limit setting of the output voltage Vfc of the fuel cell 10 by the output ceiling voltage Vfc_MAX is effective. Thus, it is possible to prevent adverse effects on the fuel cell 10.

(2) According to this embodiment, since the output voltage Vfc of the fuel cell 10 is capped at the first voltage V1, which is not greater than the high-potential avoiding voltage Vh_LIM, when it is determined that fuel gas in at least the amount capable of generating power remains, it is possible to prevent the deterioration of the fuel cell.

(3) According to this embodiment, since it is determined that fuel gas in at least the amount capable of generating power remains when the output voltage Vfc of the fuel cell 10 is a predetermined threshold voltage Vth1 or higher, it is possible to properly determine the remaining condition of the fuel gas.

(4) According to this embodiment, it is determined that fuel gas in at least the amount capable of generating power remains when the pressure of the fuel gas is a predetermined threshold pressure Pth or higher. Thus, it is possible to properly determine the remaining condition of the fuel gas.

(5) According to this embodiment, since the first converter 11 is stopped only when it is determined that fuel gas in at least the amount capable of generating power does not remain in the fuel cell 10, it is possible to effectively reduce the consumed voltage while preventing the drawback of rise in the output voltage.

(6) According to this embodiment, when the output voltage Vfc of the fuel cell 10 reaches the threshold voltage Vth2 for supplying the fuel gas, the first converter 11 is foremost driven, and the fuel gas is subsequently supplied. Thus, since the upper limit setting of the output voltage Vfc of the fuel cell 10 by the output ceiling voltage Vfc_MAX is already effective at the time that the output voltage starts to rise in the supply of the fuel gas, it is possible to prevent the output voltage Vfc from reaching the high-potential avoiding voltage Vh_LIM.

(7) According to this embodiment, since the output ceiling voltage Vfc_MAX is set to the second voltage V2 upon driving the first converter 11 prior to supplying the fuel gas, it is possible to prevent the output voltage Vfc reaching the high-potential avoiding voltage Vh_LIM.

(Modified Examples)

The present invention is not limited to the foregoing embodiments, and can be modified as needed and applied to the extent that it does not deviate from the gist of this invention.

For example, in the foregoing embodiments, the present invention was applied to the fuel cell system 100 comprising the first converter 11, the second converter 12, and the inverter 14, but is not limited to this configuration. The present invention can also be applied to a system with only one DC-DC converter or a fuel cell system comprising three or more DC-DC converters.

Moreover, although the remaining amount of hydrogen gas was measured in the foregoing embodiment, the amount of oxidation gas can also be measured. Further, the remaining amount of hydrogen gas and the remaining amount of oxidation gas can both be measured.

Moreover, although oxidation gas was used as the fuel gas to be supplied during the shortage of fuel gas in the foregoing embodiments, it is also possible to supply hydrogen gas. Further, both oxidation gas and hydrogen gas can be supplied.

INDUSTRIAL APPLICABILITY

The fuel cell system and control method thereof of the present invention can also be mounted and applied to other movable bodies without limitation to vehicles. As such movable bodies, the present invention can be applied to trains, ships, aircraft, submarines and so on. Moreover, without limitation to a movable body such as a vehicle, the present invention can also be applied to a stationary power system or a portable power system.

REFERENCE SIGNS LIST

10 . . . fuel cell, 11 . . . first converter, 12 . . . second converter, 13 . . . battery, 14 . . . inverter, 15 . . . motor, 16 . . . differential, 17 . . . tire, 18 . . . auxiliary inverter, 19 . . . high voltage auxiliary machine, 20 . . . control device, 21 . . . pressure sensor, 22 . . . cell monitor, 23 . . . various sensor group, 24 . . . rotational speed sensor, 100 . . . fuel cell system, 201 . . . fuel gas supply stopping means, 202 . . . remaining fuel gas amount determination means, 203 . . . converter driving means, 204 . . . converter stopping means, 205 . . . intermittent operation control means, N . . . motor rotational speed, SN . . . rotational speed signal, SP . . . pressure detection signal, SV . . . voltage detection signal, Vfc . . . output voltage of fuel cell 10, Vinv . . . input voltage of inverter 14, Vfc_MAX . . . output ceiling voltage of first converter 11, Vh_LIM . . . high-potential avoiding voltage, OCV . . . open voltage, CVfc . . . control command of first converter 11, CVinv . . . drive control command of second converter 12

We claim:

1. A fuel cell system, comprising:
a fuel cell;
a converter which is connected between the fuel cell and a high voltage system, and which sets an output ceiling voltage of the fuel cell;
a supply unit that supplies fuel gas; and
a control device programmed to control the fuel cell and the converter,
wherein, when it is determined that the fuel gas in at least an amount capable of generating power remains in the fuel cell in an operation mode of temporarily stopping the power generation of the fuel cell, the control device prohibits the converter from being temporarily stopped,
wherein the control device is programmed to drive the converter foremost, when the output voltage of the fuel cell reaches a threshold voltage for supplying the fuel gas, wherein the threshold voltage is defined as a minimum voltage value that prevents damaging the fuel cell, and
wherein, the control device is further programmed to subsequently control the supply unit to supply the fuel gas.

2. The fuel cell system according to claim 1,
wherein, when it is determined that fuel gas in at least the amount capable of generating power remains in the fuel cell, the converter is controlled so that the output ceiling voltage of the fuel cell becomes a first voltage capable of preventing deterioration of the fuel cell.

3. The fuel cell system according to claim 1, wherein, when an output voltage of the fuel cell is a predetermined threshold voltage or higher, it is determined that fuel gas in at least the amount capable of generating power remains.

4. The fuel cell system according to claim 1, wherein, when a pressure of the fuel gas is a predetermined threshold pressure or higher, it is determined that fuel gas in at least the amount capable of generating power remains.

5. The fuel cell system according to claim 1, wherein the converter is temporarily stopped when it is determined that fuel gas in at least the amount capable of generating power does not remain in the fuel cell.

6. The fuel cell system according to claim 1, wherein the converter is controlled so that the output ceiling voltage of the fuel cell becomes a second voltage capable of preventing deterioration of the fuel cell.

7. A fuel cell system, comprising:
an inverter connected to a loading device;
a first converter connected between a fuel cell and the inverter, and which sets an output ceiling voltage of the fuel cell;
a second converter connected between an electric storage device and the inverter, and which sets an input voltage of the inverter;
a supply unit that supplies fuel gas; and
a control device programmed to control the first converter and the second converter,
wherein, when it is determined that the fuel gas in at least an amount capable of generating power remains in the fuel cell in an operation mode of temporarily stopping the power generation of the fuel cell, the control device prohibits the first converter from being temporarily stopped,
wherein the control device is programmed to drive the first converter foremost, when the output voltage of the fuel cell reaches a threshold voltage for supplying the fuel gas, wherein the threshold voltage is defined as a minimum voltage value that prevents damaging the fuel cell, and
wherein, the control device is further programmed to subsequently control the supply unit to supply the fuel gas.

8. A fuel cell system including a fuel cell, and a converter which is connected between the fuel cell and a high voltage system and which sets an output ceiling voltage of the fuel cell, comprising:

a supply unit that supplies fuel gas;
a fuel gas supply stopping device that stops the supply of the fuel gas to the fuel cell in an operation mode of temporarily stopping the power generation of the fuel cell;
remaining fuel gas amount determination means for determining whether fuel gas in at least an amount capable of generating power remains in the fuel cell;
a converter driving device that drives the converter so that, when it is determined that fuel gas in at least the amount capable of generating power remains in the fuel cell, the output ceiling voltage of the fuel cell becomes a first voltage capable of preventing deterioration of the fuel cell; and
converter stopping means programmed to temporarily stop the converter when it is determined that the fuel gas in at least the amount capable of generating power does not remain in the fuel cell,
wherein the converter driving device is programmed to drive the converter foremost, when the output voltage of the fuel cell reaches a threshold voltage for supplying the fuel gas, wherein the threshold voltage is defined as a minimum voltage value that prevents damaging the fuel cell, and wherein, subsequently, the supply unit supplies the fuel gas.

9. A method of controlling a fuel cell system including a fuel cell, and a converter which is connected between the fuel cell and a high voltage system and which sets an output ceiling voltage of the fuel cell, comprising:
supplying fuel gas with a supply unit;
stopping the supply of the fuel gas to the fuel cell in an operation mode of temporarily stopping the power generation of the fuel cell;
determining whether fuel gas in at least an amount capable of generating power remains in the fuel cell;
driving the converter so that, when it is determined that fuel gas in at least the amount capable of generating power remains in the fuel cell, the output ceiling voltage of the fuel cell becomes a first voltage capable of preventing deterioration of the fuel cell; and
temporarily stopping the converter when it is determined that fuel gas in at least the amount capable of generating power does not remain in the fuel cell,
driving the converter foremost, when the output voltage of the fuel cell reaches a threshold voltage for supplying the fuel gas, wherein the threshold voltage is defined as a minimum voltage value that prevents damaging the fuel cell, and subsequently supplying the fuel gas.

* * * * *